United States Patent [19]
Wagensonner et al.

[11] 3,977,776
[45] Aug. 31, 1976

[54] MOTION PICTURE CAMERA WITH IMPROVED FRAME COUNT INDICATOR

[75] Inventors: Eduard Wagensonner, Aschheim; Alfred Winkler, Munich; Friedrich Winkler, Unterhaching, all of Germany

[73] Assignee: AGFA-Gevaert, A.G., Leverkusen, Germany

[22] Filed: Aug. 22, 1975

[21] Appl. No.: 607,056

[30] Foreign Application Priority Data
Aug. 30, 1974 Germany............................ 2441542

[52] U.S. Cl................................. 352/171; 352/172
[51] Int. Cl.²........................................... G03B 1/60
[58] Field of Search ............ 352/170, 171, 172, 166

[56] References Cited
UNITED STATES PATENTS

| | | | |
|---|---|---|---|
| 3,205,507 | 9/1965 | Hochstein | 352/171 |
| 3,782,813 | 1/1974 | Isono | 352/171 |

*Primary Examiner*—Monroe H. Hayes
*Attorney, Agent, or Firm*—Michael J. Striker

[57] ABSTRACT

Pulses are furnished which each indicate transport of a frame. The pulses are counted on a BCD counter. Selected outputs of the counter are connected to the inputs of coupling stages, each including a JK flip-flop. Each flip-flop changes state for a predetermined count on the counter. When each flip-flop changes state, a corresponding indicator lights up, thereby furnishing an indication to the photographer of how many frames have been transported.

8 Claims, 3 Drawing Figures

| Bildzahl n | $Z_1$ | $Z_2$ | $L_1$ | $L_2$ | $L_3$ | $L_4$ | $L_5$ | $L_6$ | $L_7$ | $L_8$ |
|---|---|---|---|---|---|---|---|---|---|---|
| | | | \multicolumn{4}{c}{$Z_3$} | \multicolumn{4}{c}{$Z_4$} | | | |
| | | | 1 | 2 | 3 | 4 | 1 | 2 | 3 | 4 |
| 0 | ----- | ----- | 0 | 0 | 0 | 0 | 0 | 0 | 0 | 0 |
| 600 | ---- | ---- | 0 | L | L | 0 | 0 | 0 | 0 | 0 |
| 1200 | ---- | ---- | 0 | L | 0 | 0 | L | 0 | 0 | 0 |
| 1800 | ---- | ---- | 0 | 0 | 0 | L | L | 0 | 0 | 0 |
| 2400 | ---- | ---- | 0 | 0 | L | 0 | 0 | L | 0 | 0 |
| 3000 | ---- | ---- | 0 | 0 | 0 | 0 | L | L | 0 | 0 |
| 3600 | ---- | ---- | 0 | L | L | 0 | L | L | 0 | 0 |

MOTION PICTURE CAMERA WITH IMPROVED FRAME COUNT INDICATOR

BACKGROUND OF THE INVENTION

The present invention resides in motion picture cameras which have film including a plurality of frames and film transport means for transporting said film. In particular, it resides in motion picture cameras wherein it is desired to furnish an indication to the photographer as to the amount of film that has been used up, that is as to how many frames have already been transported by the transport means.

SUMMARY OF THE INVENTION

It is an object of the present invention to furnish a motion picture camera in which the frame counting means have greater accuracy, greater reliability and smaller physical dimensions than known frame-counting arrangements. Further, the frame-counting means are to be implemented electronically and the possibility must exist that control functions can be derived from predetermined counts on the frame counter.

In accordance with the present invention, pulse generator means are furnished which are coupled to the film-transport means and generate at least one pulse for each frame transported by said film-transport means. Counting means are connected to the pulse generator means for counting said pulses and furnishing counting signals signifying the number of so-counted pulses. A plurality of coupling means are connected to the counting means, each for furnishing a coupling output signal in response to a corresponding one of said counting signals and for storing said coupling output signals thereby furnishing a stored coupling output signal; finally, a plurality of indicator means are furnished each connected to one of said coupling means, each for furnishing a visual indication of the corresponding one of said stored coupling output signals.

In a preferred embodiment of the present invention each of the coupling means is responsive to one predetermined counting signal only and furnish the coupling output signal in response thereto, while the storage means comprise bistable circuit means which switch from a first to a second stable state in response to the corresponding one of the coupling output signals. When the bistable circuit means are in the second stable state, the corresponding one of the indicator means lights. Further, in a preferred embodiment of the present invention the indicator means are mounted for furnishing the indication in the view finder of the camera.

In a preferred embodiment of the present invention each individual frame or a group of frames can furnish part of a lengthwise indication, the total length of which corresponds to the total film length. Further, in a preferred embodiment, the frame count indicator is embodied in an electronic building block or, alternatively, forms part of an integrated circuit which also has regulatory or control functions.

In a preferred embodiment of the present invention each of the coupling stages comprises a JK-master-slave flip-flop. Its J input is connected to the output of an AND-gate connected to the counting means to receive a corresponding counting output signal signifying a corresponding number of frames. Further, in a preferred embodiment of the present invention, the individual indicators are arranged next to each other so that the sequential lighting up of adjacent indicators forms a line whose length is indicative of the total number of frames that has been transported.

In a further preferred embodiment of the present invention, the output of the coupling means indicating the last frame to be transported is connected to motor stop means whose output is in turn connected to the film transport. In this embodiment, the film transport is stopped in response to the coupling output signal signifying the last transported frame. This is possible since, in accordance with the present invention, each frame is counted individually.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1A:
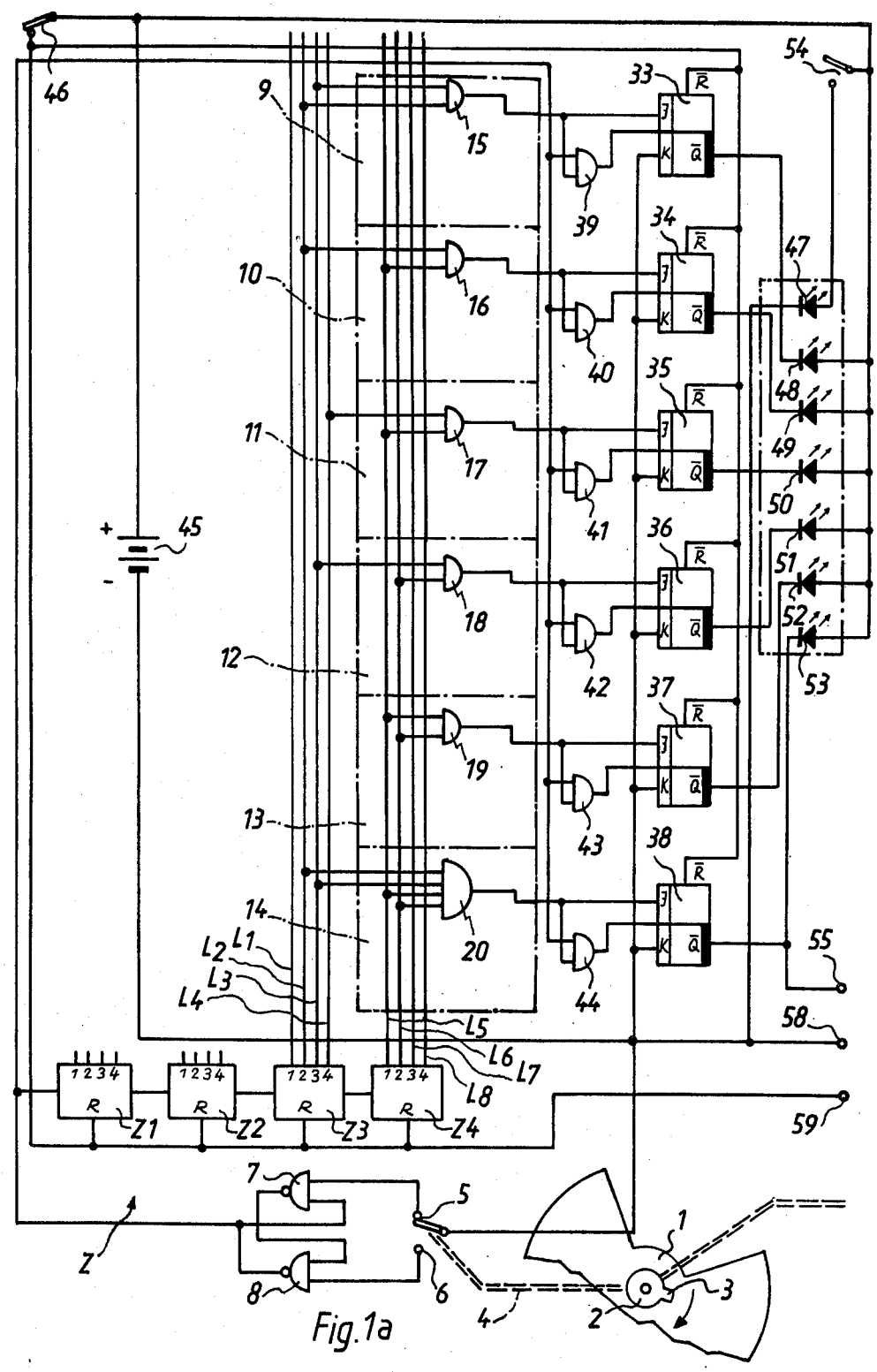
FIGS. 1a and 1b together constitute a schematic diagram of the arrangement of the present invention.

A preferred embodiment of the present invention will now be described with reference to the drawing.

FIG. 1a shows a rotary shutter 1 having a shaft 2 on which arranged a cam disk 3. Cam disk 3 operates a switch 5, 6, through a coupling 4. Connected to switch 5, 6 are two NAND-gates 7, 8 which serve as buffer stages. The output of NAND-gate 8 is connected to the input of a counting stage Z1 of a binary coded decimal counter Z. Cam disk 3, switches 5 and 6, and NAND-gates 7 and 8 together constitute pulse generator means, while the counter Z is herein referred to as counting means. Counting stage Z1 is followed by further stages Z2, Z3 and Z4. The reset inputs of the counting stages are denoted by R. Each of stages Z1, Z2, Z3 and Z4 has four outputs, denoted 1, 2, 3 and 4. Each of the stages in itself is a binary coded decimal counter. Stage Z1 counts pulses 0 to 9, stage Z2 counts tens, stage Z3 counts one-hundreds, while stage Z4 counts thousands. It will be noted that the outputs of stage Z1 and Z2 are not utilized, since only frame groups including at least 100 frames are to be indicated.

Output lines L1–L4 of stage Z3 and output lines L5 to L8 of stage Z4 are connected to the inputs of coupling means denoted by reference numerals 9, 10, 11, 12, 13 and 14. Coupling means 9 to 14 each comprise an AND-gate, each of the AND-gates having inputs connected to those counting outputs which will furnish a "1" signal when the counter has reached the corresponding counting signal. The AND-gates associated with stages 9, 10, 11, 12, 13 and 14 have reference numerals 15, 16, 17, 18, 19 and 20 respectively.

Figures 1B, 2:
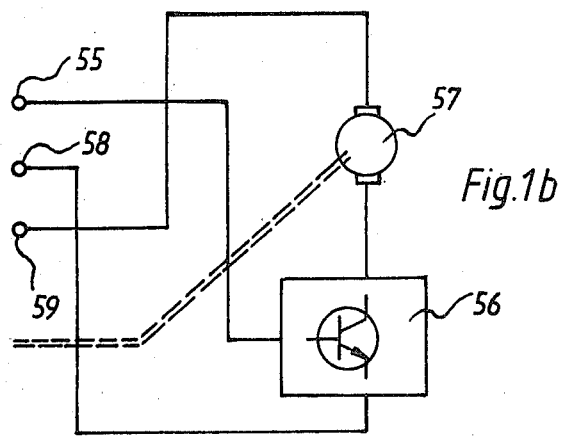
FIG. 2 shows the truth table for the counter outputs signifying the start of sequential frame groups.

In the embodiment in FIGS. 1a and 1b it is assumed that the motion picture film comprises approximately 3,600 frames. Indication of frame groups each comprising 600 frames is considered adequate. The truth table shown in FIG. 2 shows the signals at the outputs of counting stages Z3 and Z4, that is the signals on lines L1 to L8 for indicating frame groups each including 600 frames. Specifically, when the number of frames transported is equal to zero, lines L1–L8 carry a zero potential. When 600 frames have been transported, lines L2 and L3 of counting stage Z3 will carry a "1" potential, while all remaining output lines, namely lines L1, L4, L5, L6, L7 and L8 will carry a "0" potential. Therefore, lines L1 and L2 are connected to the inputs of the coupling means 9, that is to the inputs of AND-gate 15. When the count of the counter reaches the number 600, lines L2 and L3 will carry a "1" potential, while the remaining lines will carry a "0" potential. The inputs of AND-gate 16 are thus connected to lines L2 and L3. Similarly, when 1,200 frames have passed, lines L2 and L5 carry a "1" potential and these lines are therefore connected to the input of AND-gate 17. Similarly, the inputs of AND-gate 18 are connected to lines L4 and L5, while those of AND-gate 19 are connected to lines L3 and L6. Finally, AND-gate 20 is a four input AND-gate having inputs connected to lines L2, L3, L5 and L6.

The outputs of AND-gates 15, 16, 17, 18, 19 and 20 are connected to the J inputs of JK-master-slave flip-flops 33, 34, 35, 36, 37 and 38 respectively.

The clock inputs of JK-master flip-flops 33–38 are connected to the outputs of further AND-gates 39, 40, 41, 42, 43 and 44. The first inputs of all the above-mentioned AND-gates 39–44 are connected to the output of NAND-gate 8; the second inputs of AND-gates 39–44 are connected, respectively, to the output of AND-gates 15, 16, 17, 18, 19 and 20. Each of the first-mentioned AND-gates 15–20 and the second-mentioned AND-gates 39–44 with the associated one of JK-master-slave flip-flops 33–38 constitute a coupling means. The K inputs of all the flip-flops 33–38 are connected to the negative terminal of a battery 45. The positive terminal of battery 45 is connected to counting stages Z1 to Z4 upon closing of a switch 46. Switch 46 is closed when closing the cover of the camera. Further, switch 46 serves to supply a "1" potential to the $\bar{R}$ input of JK-master-slave flip-flops 33–38. In response to a "1" potential at the $\bar{R}$ input, each of the flip-flops is reset, that is a "1" potential appears at the $\bar{Q}$ output.

Each $\bar{Q}$ output of flip-flops 33–38 is connected to a light-emitting diode 48, 49, 50, 51, 52 and 53 respectively. The output of these diodes as well as that of a further light-emitting diode 47 is visible in the view finder. One terminal of light-emitting diode 47 is directly connected to the negative side of battery 45 while its other terminal is connected to the positive side of battery 45 through a switch 54. Switch 54 is closed upon insertion of a cassette. Light-emitting diode 47 glows continuously when a film casette is in the camera and switch 54 is thus closed.

When 600 frames have been counted, that is when the 600 pulse is generated, the first input of AND-gate 39 receives a pulse from AND-gate 15 of the first coupling means 9, while its second input receives the "1" potential directly from the output of NAND-gate 8. Thus AND-gate 39 furnishes an output to the clock input of JK flip-flop 33. The J input of flip-flop 33 also receives a "1" potential, namely from the output of AND-gate 15 directly. Thus flip-flop 33 is switched to the state wherein the $\bar{Q}$ output furnishes the "0" potential. Light-emitting diode 48 is then connected from positive to zero potential and is therefore energized and lights. The photographer thus knows that 600 frames have been transported.

When the twelve-hundredth pulse is generated, the $\bar{Q}$ output of flip-flop 34 furnishes a "0" potential, so that light-emitting diode 49 glows. The same process is repeated so that diodes 50–53 light when the 1800th, the 2400th, the 3000th and the 3600th pulses are furnished, respectively.

The $\bar{Q}$ output of flip-flop 38 is connected through terminal 55 with the input of a control circuit 56 (FIG. 1b). Control circuit 56 is herein referred to as motor stop means. A film transport motor denoted by reference numeral 57 is connected in series with the control circuit 56. The voltage of battery 45 is applied to the circuit of FIG. 1b at terminals 58 and 59. When the count on the counter reaches the number 3600, the potential at the $\bar{Q}$ output of flip-flop 38 switches to "0". This causes the transistor connected in series with motor 57 to block, thereby causing the motor to be deenergized and the film transport to be interrupted.

When the camera cover is open, switch 46 opens. This causes a pulse to be generated which causes counting stages Z1–Z4 to be reset to their initial position. The same is true for flip-flops 33 through 38. When switch 46 is again reclosed, the "1" potential is applied to the $\bar{R}$ inputs of JK flip-flops 33–38, thereby causing the $\bar{Q}$ outputs of all the flip-flops to furnish a "1" potential. All of diodes 48–53 are thus deenergized. Only diode 47 indicates to the photographer that a cassette is present in the camera.

While the invention has been illustrated and described as embodied in specific types of coupling and indicator means, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a motion picture camera having film including a plurality of frames and film-transport means for transporting said film, a frame counting and indicator arrangement, comprising, in combination, pulse generator means coupled to said film-transport means for generating at least one pulse for each frame transported by said film-transport means; counting means connected to said pulse generator means for counting the number of so-furnished pulses and furnishing counting signals signifying said number; a plurality of coupling means connected to said counting means, each for furnishing a coupling output signal in response to a corresponding one of said counting signals and for storing said coupling output signal thereby furnishing a stored coupling output signal; and a plurality of indicator means connected to said coupling means, each for furnishing a visual indication of a corresponding one of said stored coupling output signals, thereby furnishing an indication of the number of frames transported by said film-transport means.

2. A motion picture camera as set forth in claim 1, wherein said camera further has a view finder; and wherein said indicator means furnish said visual indications in said view finder.

3. A motion picture camera as set forth in claim 1, wherein said coupling means comprise means for furnishing a sequence of coupling output signals each signifying transport of a predetermined number of frames following the last previous one of said coupling output signals in said sequence; and wherein each of said coupling means comprise bistable circuit means switched from a first to a second stable state in response to said corresponding one of said counting signals.

4. A motion picture camera as set forth in claim 3, wherein each of said bistable circuit means comprises a JK-master-slave flip-flop.

5. A motion picture camera as set forth in claim 4, wherein said counting means comprise a plurality of counting stages, each of said counting stages having a plurality of counting outputs of furnishing counting signals signifying the number in a corresponding decimal place in said counting output signal; and wherein said coupling means each comprise an AND-gate, each of said AND-gates having inputs connected to at least one of said counting stages and an output connected to a corresponding one of said JK-master-slave flip-flops.

6. A motion picture camera as set forth in claim 5, wherein each of said JK-master-slave flip-flops has a J input, a K input, a clock input, a Q output and a $\overline{Q}$ output; further comprising a plurality of additional AND-gates corresponding in number to said plurality of JK-master-slave flip-flops, each of said additional AND-gates having one input connected to the output of the corresponding one of said AND-gates, a second input connected to said pulse generator means, and an output connected to said clock input of said corresponding one of said JK-master flip-flops.

7. A motion picture camera as set forth in claim 6, wherein each of said indicator means is connected to the $\overline{Q}$ output of the corresponding one of said JK-master-slave flip-flops.

8. A motion picture camera as set forth in claim 1, wherein a selected one of said coupling means furnishes a stored coupling output signal signifying the last frame on said film; further comprising motor stop means connected between said selected one of said coupling means and said film-transport means, for stopping said film transport in response to the stored coupling output signal furnished by said selected one of said coupling means.

* * * * *